(12) United States Patent
Auger (10) Patent No.: US 11,513,023 B2
(45) Date of Patent: Nov. 29, 2022

(54) SYSTEM AND METHOD FOR DETECTING AND CONTAINING LIQUID LEAKS

(71) Applicant: Andre Auger, Saint-Jerome (CA)

(72) Inventor: Andre Auger, Saint-Jerome (CA)

( * ) Notice: Subject to any disclaimer, the term of this patent is extended or adjusted under 35 U.S.C. 154(b) by 0 days.

(21) Appl. No.: 17/087,228

(22) Filed: Nov. 2, 2020

(65) Prior Publication Data

US 2021/0131901 A1 May 6, 2021

Related U.S. Application Data

(60) Provisional application No. 62/929,478, filed on Nov. 1, 2019.

(51) Int. Cl.
*B65D 1/34* (2006.01)
*G01M 3/04* (2006.01)
*F16K 17/36* (2006.01)

(52) U.S. Cl.
CPC .............. *G01M 3/04* (2013.01); *F16K 17/36* (2013.01); *Y10T 137/5762* (2015.04)

(58) Field of Classification Search
CPC ................................................ Y10T 137/5762
USPC .............................................. 4/658; 220/571
See application file for complete search history.

(56) References Cited

U.S. PATENT DOCUMENTS

| | | | | |
|---|---|---|---|---|
| 2,479,000 A * | 8/1949 | Buczkowski | ............. | E03D 1/01 4/251.2 |
| 4,369,532 A * | 1/1983 | Houchins | ................ | E03C 1/182 4/619 |
| 4,903,723 A * | 2/1990 | Sublett | ................ | A47L 15/4212 137/312 |
| 5,224,508 A * | 7/1993 | Bates, Jr. | ............... | D06F 39/081 137/312 |
| 5,883,300 A * | 3/1999 | Johnson | ..................... | B60R 5/04 73/40 |
| 6,059,387 A * | 5/2000 | Echard | .................... | A47B 77/08 220/571 |
| 6,135,133 A * | 10/2000 | Ridgeway, Jr. | ......... | F24H 9/165 122/504.2 |
| 6,412,638 B1 * | 7/2002 | Carter | ...................... | B65D 1/34 206/557 |
| 6,718,788 B1 * | 4/2004 | Shuck | .................... | B21D 51/18 220/571 |
| 6,950,032 B1 * | 9/2005 | Hewitt | .................. | D06F 39/081 340/686.1 |
| 7,735,510 B1 * | 6/2010 | Carter | .................... | A47B 97/00 137/312 |
| 7,938,288 B2 * | 5/2011 | Oakner | ................... | F24F 13/22 220/571 |
| 8,348,359 B2 * | 1/2013 | DeBoer | ................. | A47B 77/06 312/229 |
| 8,590,559 B1 * | 11/2013 | Gutierrez | ................ | G01M 3/16 137/312 |
| 10,330,257 B2 * | 6/2019 | Lambert | .................. | F24H 9/165 |
| 2007/0169256 A1 * | 7/2007 | Arraz | ..................... | A47B 77/06 4/251.1 |

(Continued)

*Primary Examiner* — Robert K Arundale
(74) *Attorney, Agent, or Firm* — Brouillette Legal Inc.; Robert Brouillette (57) ABSTRACT

An apparatus for collecting liquid leaks, the apparatus comprising a tub, at least one boot for sealing a pipe passing through the tub for preventing leakage of the tub from water leakage collected in the tub from either a fluid reservoir disposed above the tub or leakage dripping along the pipe.

11 Claims, 10 Drawing Sheets

(56) References Cited

U.S. PATENT DOCUMENTS

| | | | | |
|---|---|---|---|---|
| 2007/0272302 A1* | 11/2007 | Carter | ................ | A47B 97/00 |
| | | | | 137/312 |
| 2008/0224581 A1* | 9/2008 | Minerva | ................ | A47B 97/00 |
| | | | | 312/229 |
| 2008/0245802 A1* | 10/2008 | Gray | ................ | F24F 13/222 |
| | | | | 220/571 |
| 2010/0083440 A1* | 4/2010 | Spurlock | ................ | E03C 1/181 |
| | | | | 4/658 |
| 2011/0162727 A1* | 7/2011 | Stieb | ................ | F17D 5/06 |
| | | | | 137/487.5 |
| 2011/0180153 A1* | 7/2011 | Carter | ................ | D06F 39/001 |
| | | | | 137/312 |
| 2014/0283925 A1* | 9/2014 | Justus | ................ | A61M 1/69 |
| | | | | 137/312 |
| 2014/0298845 A1* | 10/2014 | Palm | ................ | F25D 21/14 |
| | | | | 62/291 |

\* cited by examiner

SYSTEM AND METHOD FOR DETECTING AND CONTAINING LIQUID LEAKS

CROSS-REFERENCE TO RELATED APPLICATIONS

The present application claims the benefits of priority of U.S. Provisional Patent Application No. 62/929,478, entitled "SYSTEM AND METHOD FOR DETECTING AND CONTAINING LIQUID LEAKS", and filed at the United States Patent and Trademark Office on Nov. 1, 2019, the content of which is incorporated herein by reference.

FIELD OF THE INVENTION

The present invention relates to water leak collectors and detectors. More specifically, the present invention relates to an adaptable, watertight collection tub for collecting water leaking from various sources and equipped with a smart alarm system for notification of a water leak and prevention of any further water damage.

BACKGROUND OF THE INVENTION

Water damage can be devastating to the integrity of a building. Often, even a small volume water leak can cause damage to either shelters or personal belongings. Several attempts have been made to develop systems to safeguard household structures using various water collection basins for collecting leaking water as well as alarm systems to notify owners when a leak does occur. Amongst the pitfalls of existing water leak detectors is the fact that there is commonly an area not covered by the basin to allow drainage pipes to pass through. Therefore, there is a need for a leak prevention apparatus that is allowing the piping system to pass through the collection tub to collect dripping from the piping system.

SUMMARY OF THE INVENTION

The present invention provides method and system for preventing water damage caused by water leaks. A water collection tub, or basin, is securely placed under a liquid receiving container, like a sink, and adapted to various cabinet configurations under the sink. The water collection tub can easily be adapted to receive various sized drainage pipes going through and securely sealed by means of a watertight pipe-sealing mechanism. The water collection tub is preferably a permanent installation, built for durability without the need for regular maintenance or inspections. The water collection tub of the present invention is designed to preferably span most or the entire surface beneath the sink to capture water leaking or dripping from above, whether from the sink, drainpipes and even condensation dripping from the pipes.

It is the object of the present invention to provide a base connected to a plurality of resilient walls that can be permanently secured to the existing structure beneath a sink, or the like.

It is another object of the present invention to accommodate various piping systems so that holes can be made within the basin, thereby allowing pipes to pass through. A pipe boot, or geomembrane boot, is then installed to seal the opening where the pipe passes through the collection tub. The resulting watertight system will prevent damages caused by water leaks.

It is yet another object of the present invention to provide a smart alarm system for detecting leaks and sending appropriate signals using, for example, the internet.

BRIEF DESCRIPTION OF THE DRAWINGS

The above and other aspects, features and advantages of the invention will become more readily apparent from the following description, reference being made to the accompanying drawings in which.

DETAILED DESCRIPTION OF THE PREFERRED EMBODIMENT

A novel system and method for detecting and containing liquid leaks will be described hereinafter. Although the invention is described in terms of specific illustrative embodiments, it is to be understood that the embodiments described herein are by way of example only and that the scope of the invention is not intended to be limited thereby.

Referring now to FIGS. 1 to 5, a water collection tub 100 or container is illustrated. In a typical embodiment, a substantially rectangular and substantially horizontal base 10 is connected to two side walls 20, a front wall 22 and a rear wall 24. Each wall 20, 22 and 24 extends from the base 10 toward a periphery of the water collection tub 100 at an angle α relative to a plane defined by the base 10. In other embodiments, one or more of the walls 20, 22 and 24 may extend from the base at a different angle.

The angle α at which the walls 20, 22 and 24 extend from the wall generally aims at improving resiliency of the walls 20, 22 and 24. The resiliency of the walls 20, 22 and 24 allows the collection tub 100 to fit various dimensions of cabinets. As dimensions of cabinets may slightly vary from one manufacturer to the other, the wall 20, 22 and 24 are adapted to flex horizontally toward the base or toward the periphery of the water collection tub 100. As such, in smaller cabinets, the walls are flexed inwardly and in a larger cabinet, the walls are flexed outwardly to provide a watertight collection tub 100 between the walls of the cabinet (not shown) and the walls 20, 22, 24 of the collection tub 100.

The base 10 is generally received by the bottom surface of the cabinet. In some embodiments, the base 10 may be suspended by attaching or securing one or more resilient wall to the inside structure of the cabinet using any suitable fastener such as, for example, glue, tape or screws.

The walls 20, 22 and 24 are made of any suitable resilient material allowing them to be slightly deformed in contact of another element, such as a cabinet wall.

The water collection tub 100 is typically made from a semi-rigid material, such as but not limited to reinforced plastic. The water collection tub 100 is adapted for containing water leaks, or other liquids, from various sources and preferably installed under a sink or a liquid reservoir.

In some embodiments, the collection tub 100 sits at the bottom of the cabinet underneath the feeding and drainage pipes. The resilient walls 20, 22 and 24 may comprise optional reinforcing members 26 on the outside surface of the walls. The reinforcing members may comprise ribs, gussets or any other structural member configured to reinforce the structural integrity of the collection tub 100. In such embodiments, the reinforcing members 26 are adapted to generally limit bending of the resilient walls 20, 22 and 24 when pressured by a fluid therein. In such embodiment, the resilient walls 20, 22 and 24, together with the reinforcing members 26, create a sealed system preventing any leaks from dripping outside the water collection tub 100.

The water collection tub 100 may be installed and securely affixed to the bottom of the cabinet. The water collection tub 100 may be affixed using any suitable fastener such as, for example, glue, tape, screws. The dimensions of the components as shown are for illustrative purposes and should not be limitative. Other configurations and dimensions are considered to remain within the scope of the present description.

Before installation, the dimensions of the inside cabinet are appreciated in relation with the collection tub 100 dimensions and the locations of the feeding and drainage piping system.

In some installation scenarios, inlet pipes or drain pipes are passed through the bottom of the cabinet. In such embodiments, apertures shall be perforated in the base 10 to allow passage of such pipes. Once the appropriate apertures or passages are made in the base 10, the water collection tub 100 is installed inside the cabinet with the pipes passing through the openings. To maintain a hermetic environment, each pipe must be sealed with a pipe boot 40 or 50.

Still referring to FIGS. 1-5, in some embodiments, the water collection tub 100 may further comprise a structure 30 mounted or overlapping over a wall 20, 22 or 24. Typically, the structure 30 is adapted to be overlapping the front wall 22. In a typical embodiment, the structure 30 comprises a slanted surface 32 adapted to receive a sticker or any other type of medium for information such as documentation, marketing or publicity. In some instances, the cabinet installer may add a sticker including his/her name and coordinates for publicity. The structure 30 may comprise a top portion 34 comprising an attachment or overlapping member 38. The structure 30 may further comprise a bottom portion 36 adapted to lay on the bottom of the cabinet. Even if the structure 30 generally aims at providing information to the user, the structure 30 may further increase rigidity of the wall being overlapped. The structure 30 is typically made of rigid material, such as aluminum, rigid plastic, metal, etc.

Figure 1:
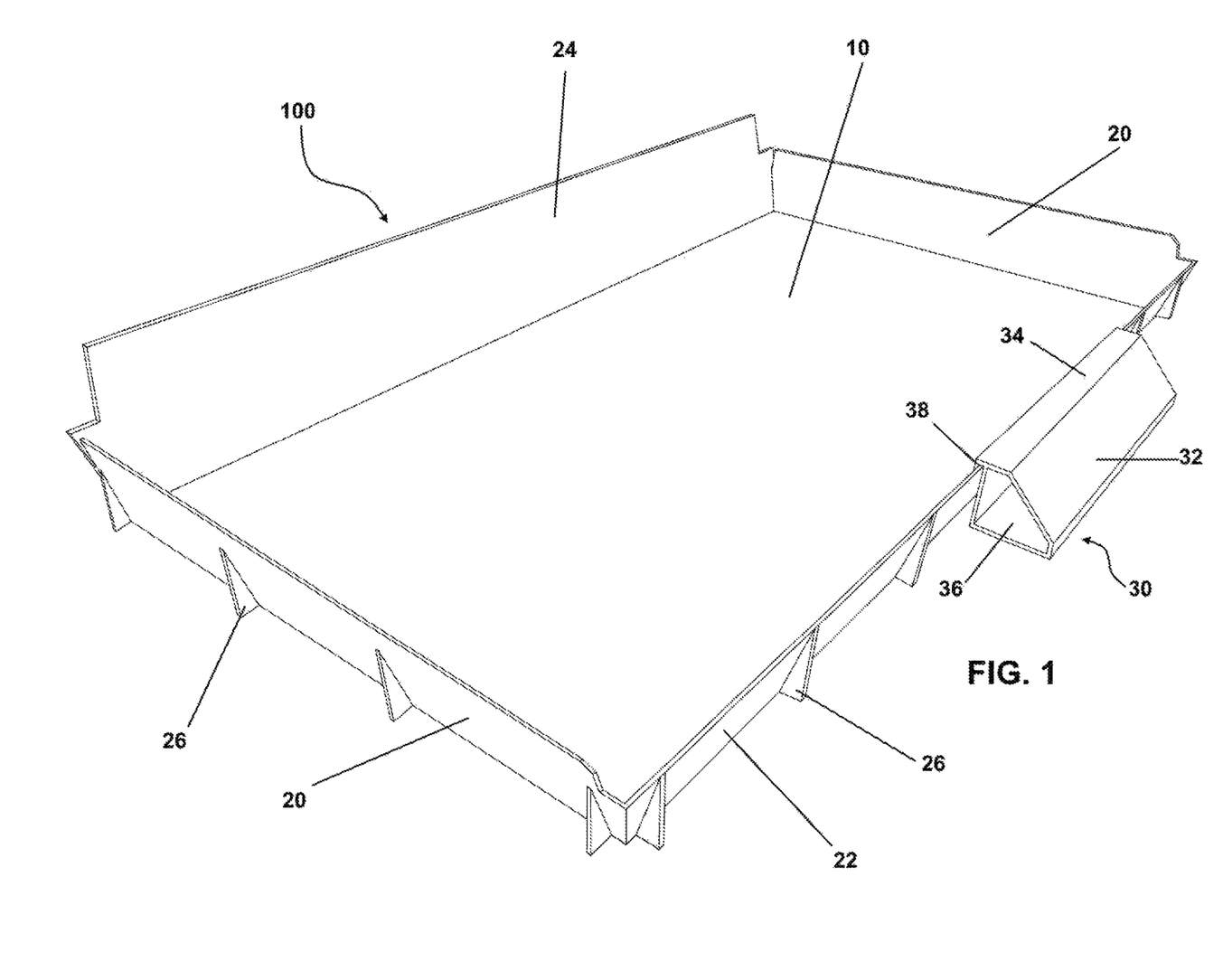
FIG. 1 is a perspective top view of a system for detecting and containing liquid leaks in accordance with the principles of the present invention.
Figure 2:
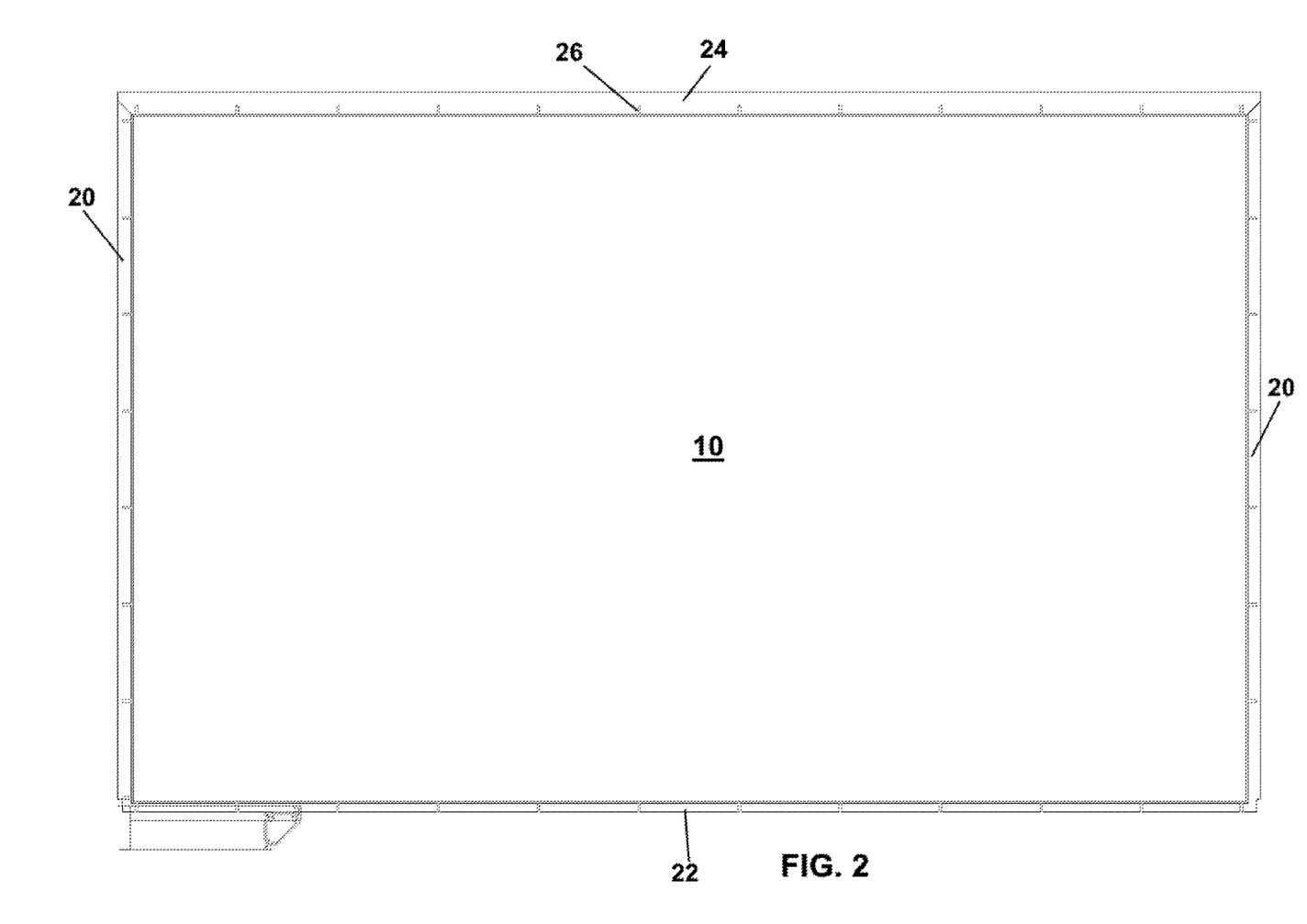
FIG. 2 is a top view of the system of FIG. 1.
Figure 3:
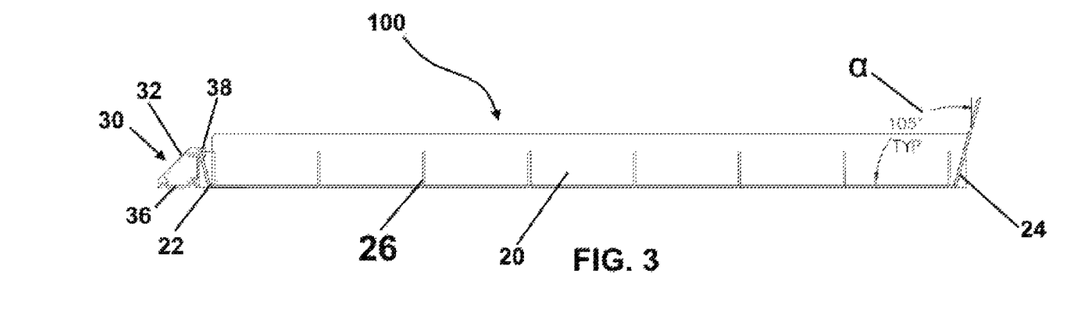
FIG. 3 is a side plan view of the system of FIG. 1.
Figure 4:
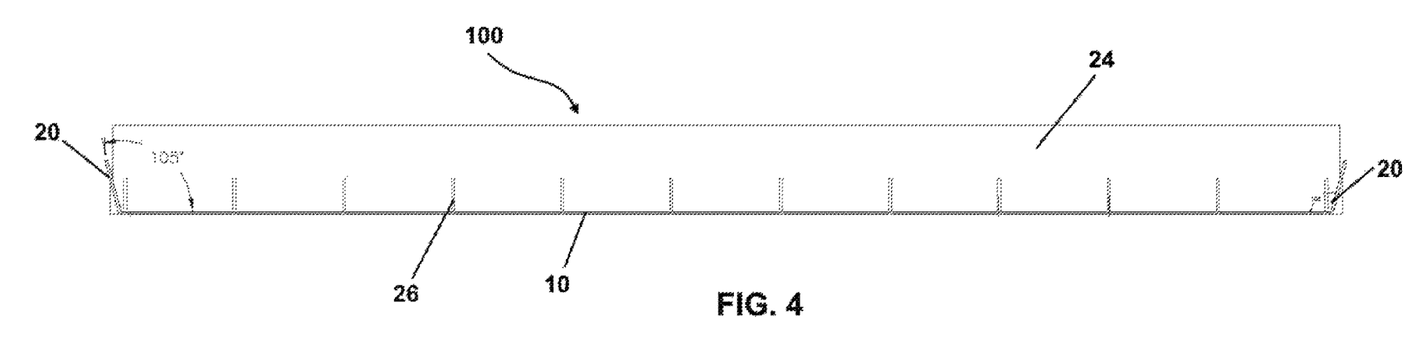
FIG. 4 is a rear plan view of the system of FIG. 1.
Figure 5:
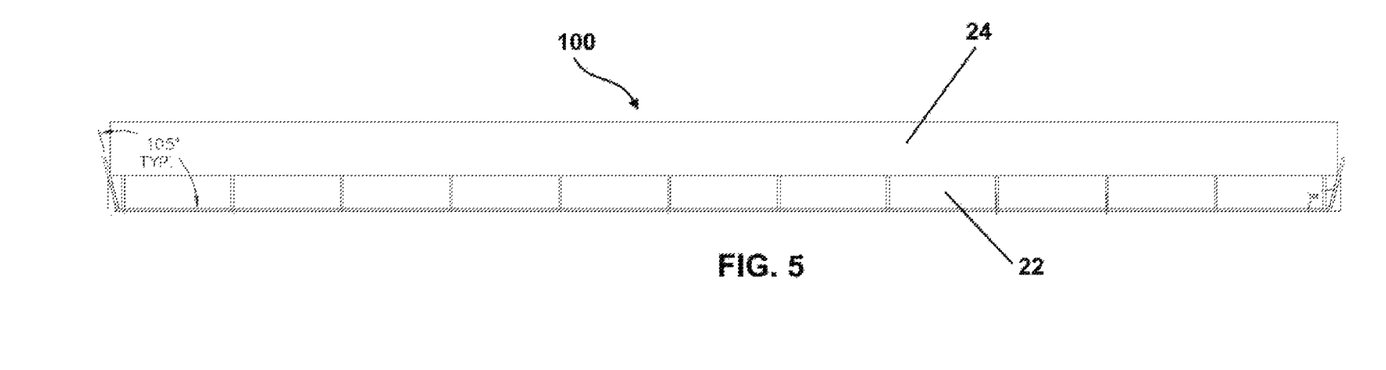
FIG. 5 is a front plan view of the system of FIG. 1.
Figure 6:
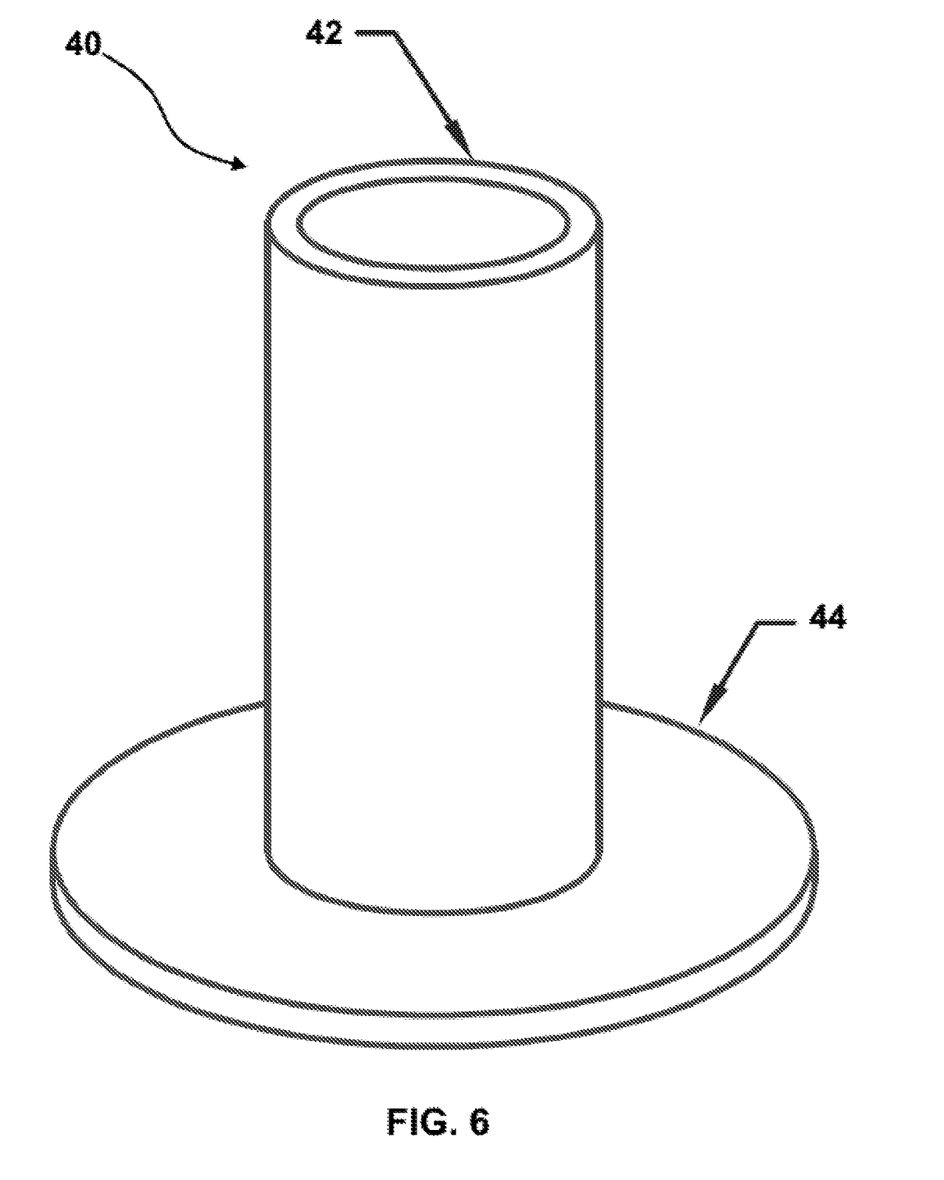
FIG. 6 is a perspective view of a pipe boot for water inlet in accordance with the principles of the present invention.
Figure 7:
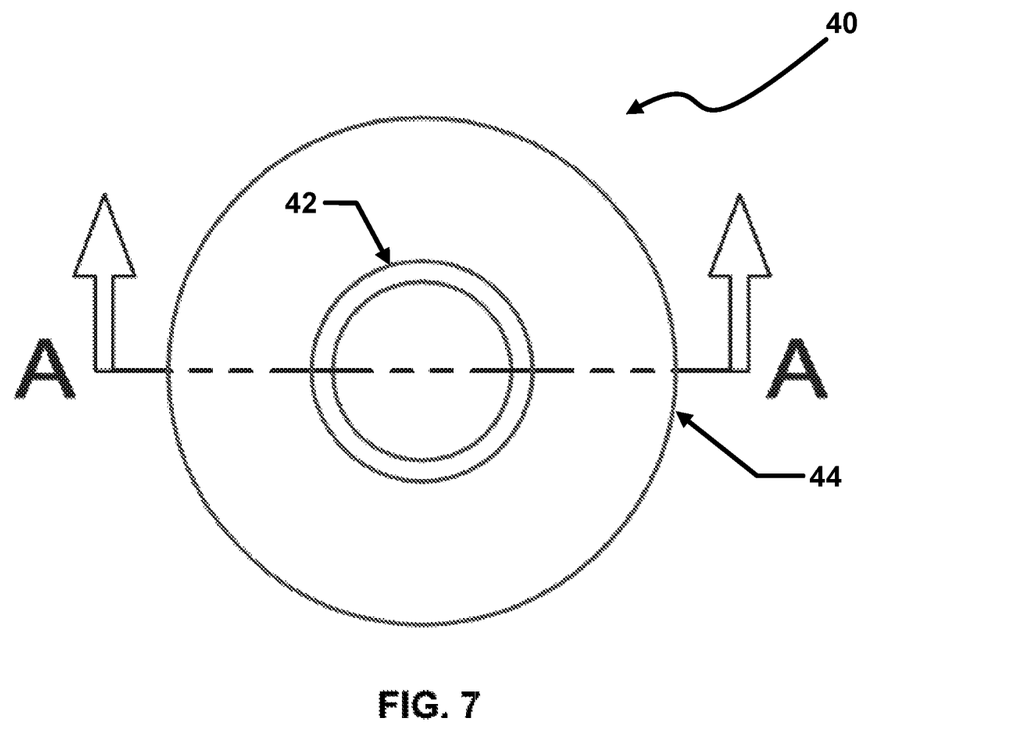
FIG. 7 is a top view of the pipe boot of FIG. 6.
Figure 8:
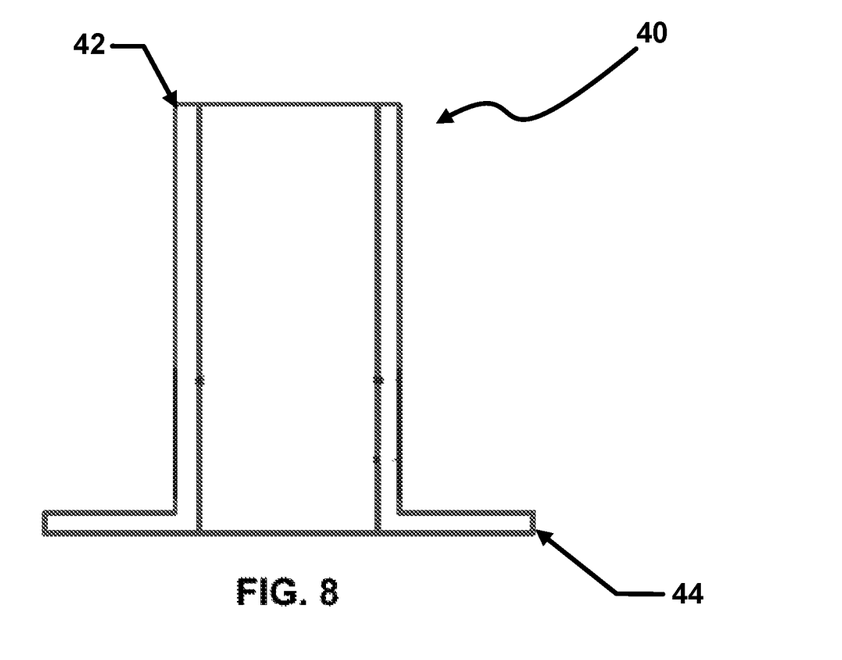
FIG. 8 is a sectional A-A plan view of the pipe boot of FIG. 7.
Figure 9:
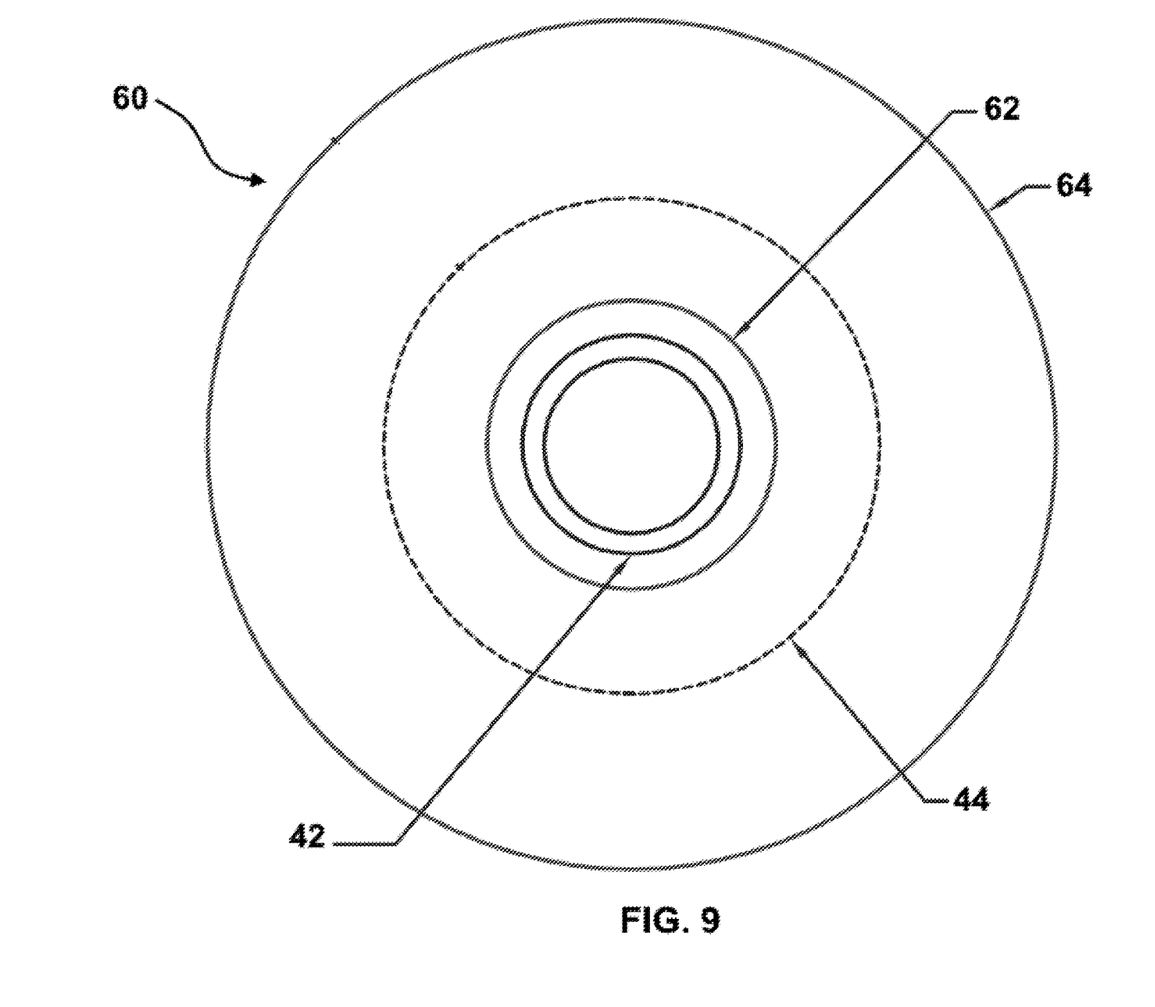
FIG. 9 is a top view of a sealing patch for the pipe boot of FIG. 6.

Referring now to FIGS. 6-8, an embodiment of a pipe boot 40 for water inlet is illustrated. The pipe boot 40 comprises an elongated section or chimney 42 adapted to receive a pipe and a base section 44 adapted to contact the base 10 of the water collection tub 100. A sealing patch 60, as shown in FIG. 9, is inserted at the periphery of the chimney 42 to sit on the base section 44. The sealing patch 60 generally comprises a central aperture 62 and a periphery 64. In a typical embodiment, the sealing patch 60 is made of nylon or any other suitable hermetical material. The sealing patch 60 may comprise an adhesive layer or may be glued or jointed to the base 10. The chimney 42 is slid in the aperture 62 and the patch 60 is pushed to contact at least in part the base 10 to cover at least some of the base section 44 of the pipe boot 40.

Figure 10:
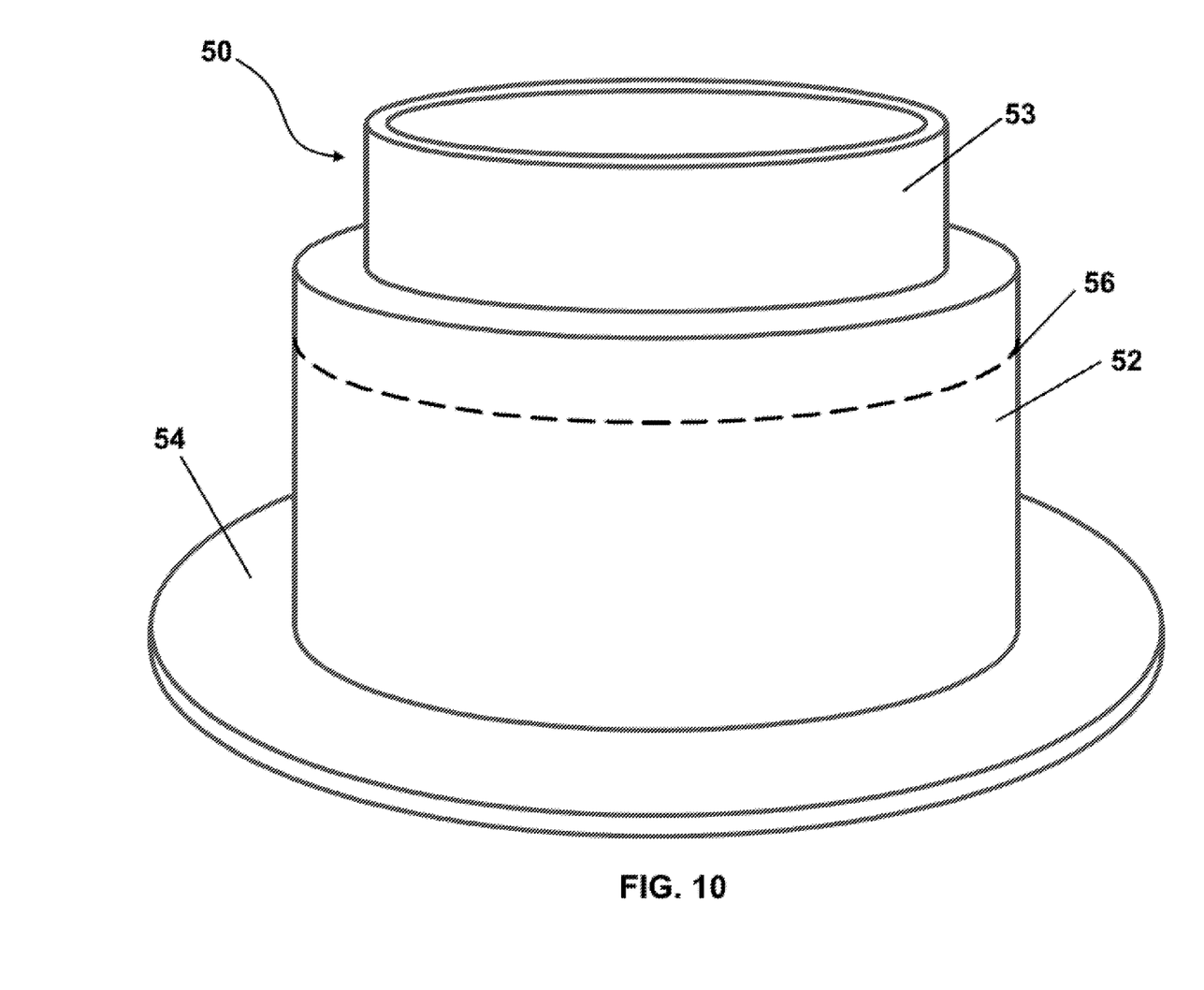
FIG. 10 is a perspective view of a pipe boot for a drain in accordance with the principles of the present invention.
Figure 11:
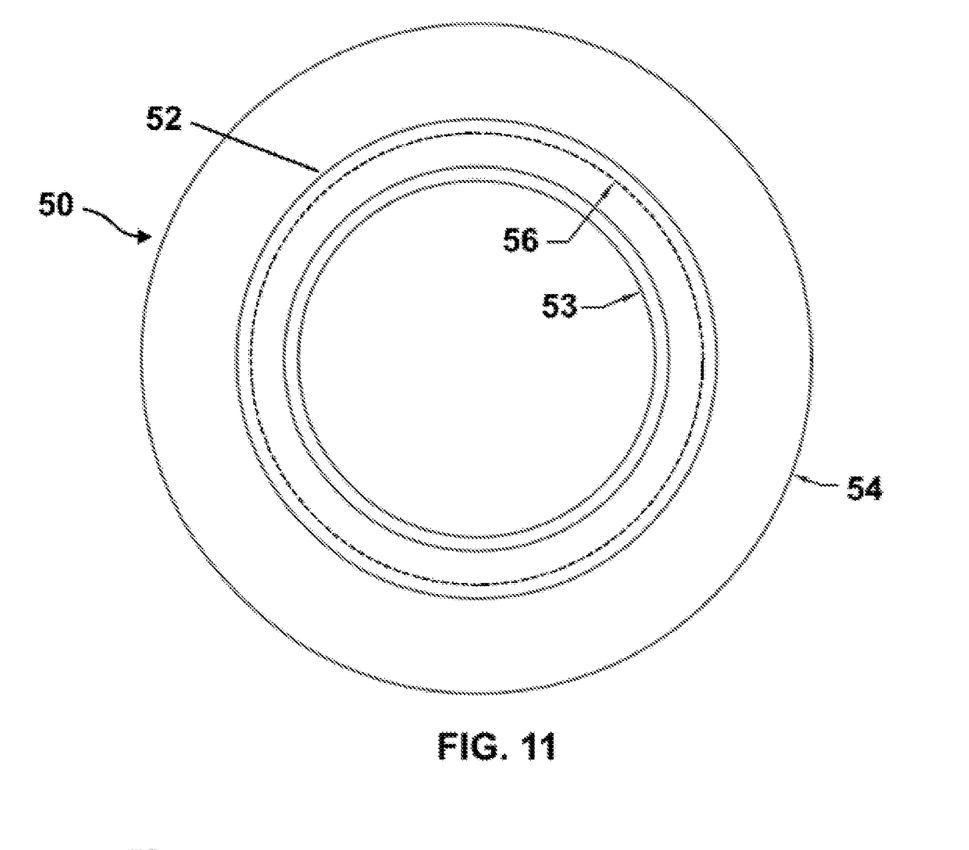
FIG. 11 is a top view of the pipe boot of FIG. 10.
Figure 12:
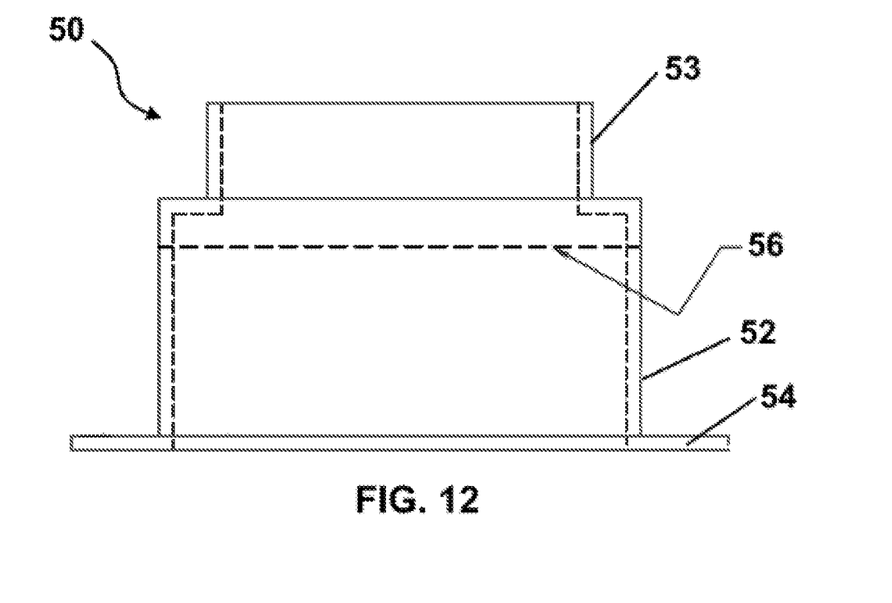
FIG. 12 is a sectional plan view of the pipe boot of FIG. 11.

Now referring to FIGS. 10 to 12, an embodiment of pipe boot 50 for a drain pipe is illustrated. In such an embodiment, the pipe boot 50 may comprise a first chimney 52 having a larger diameter than a second chimney 53 having a reduced diameter. In such an embodiment, a user may cut the first chimney 52 along a mark or line 56 to adapt to a smaller or larger drain pipe. The pipe boot 50 is used similarly to the inlet pipe boot 40.

Figure 13:
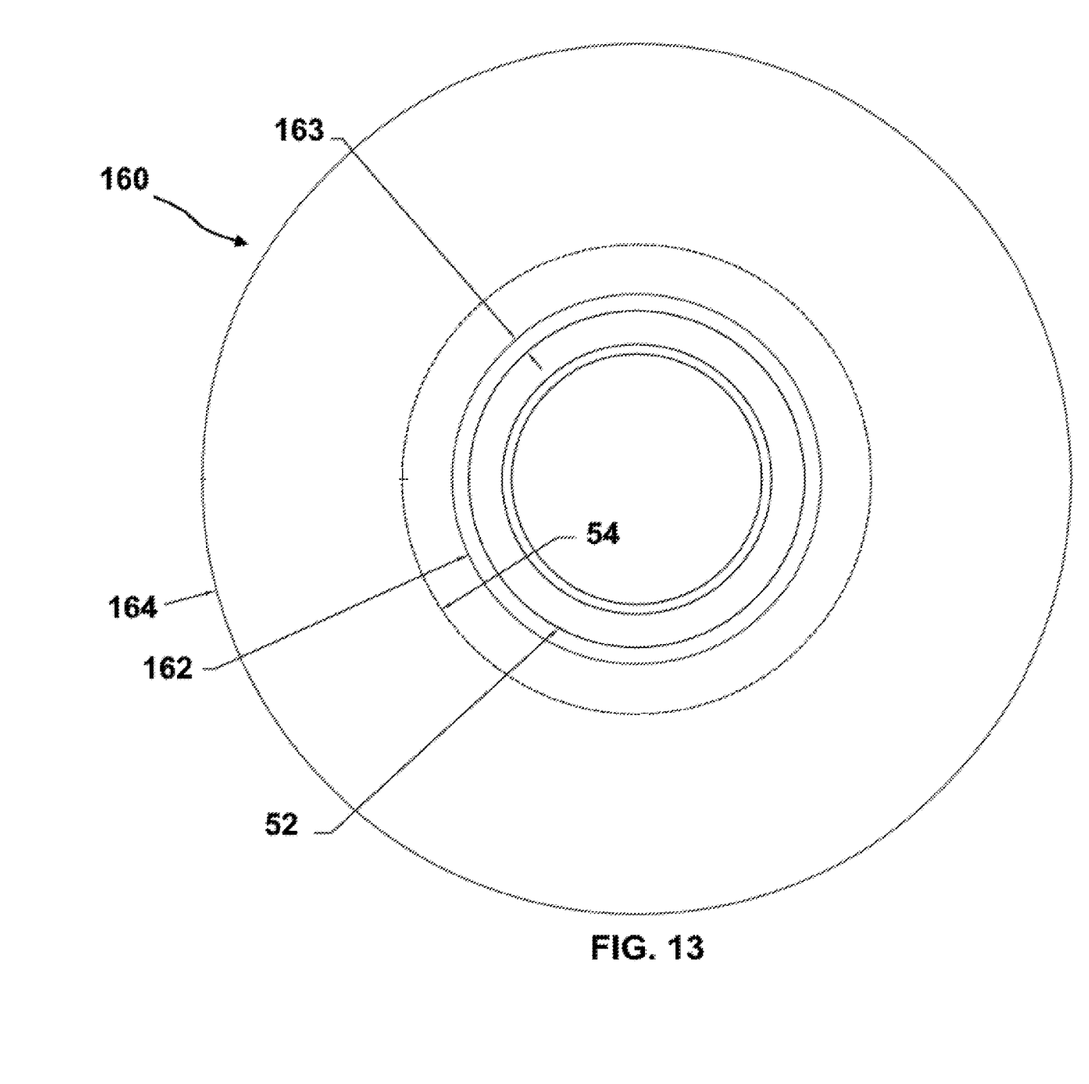
FIG. 13 is a top view of a sealing patch for the pipe boot of FIG. 10.

Similar to sealing patch 60, a sealing patch 160 as shown in FIG. 13, is inserted at the periphery of the chimney 52 to sit on the base section 54. The sealing patch 160 generally comprises a central aperture 162 and a periphery 164. In a typical embodiment, the sealing patch 160 is made of nylon or any other suitable hermetical material. The sealing patch 160 may comprise an adhesive layer or may be glued or jointed to the base 10. The chimney 52 is slid in the aperture 162 and the patch 160 is pushed to contact at least in part the base 10 to cover at least some of the base section 54 of the pipe boot 50. In some embodiments, the aperture 162 is larger than the diameter of the first chimney 52, thus forming a empty space 163 in-between. The aperture 162 shall also have a diameter slightly larger than the first chimney.

Figure 14:
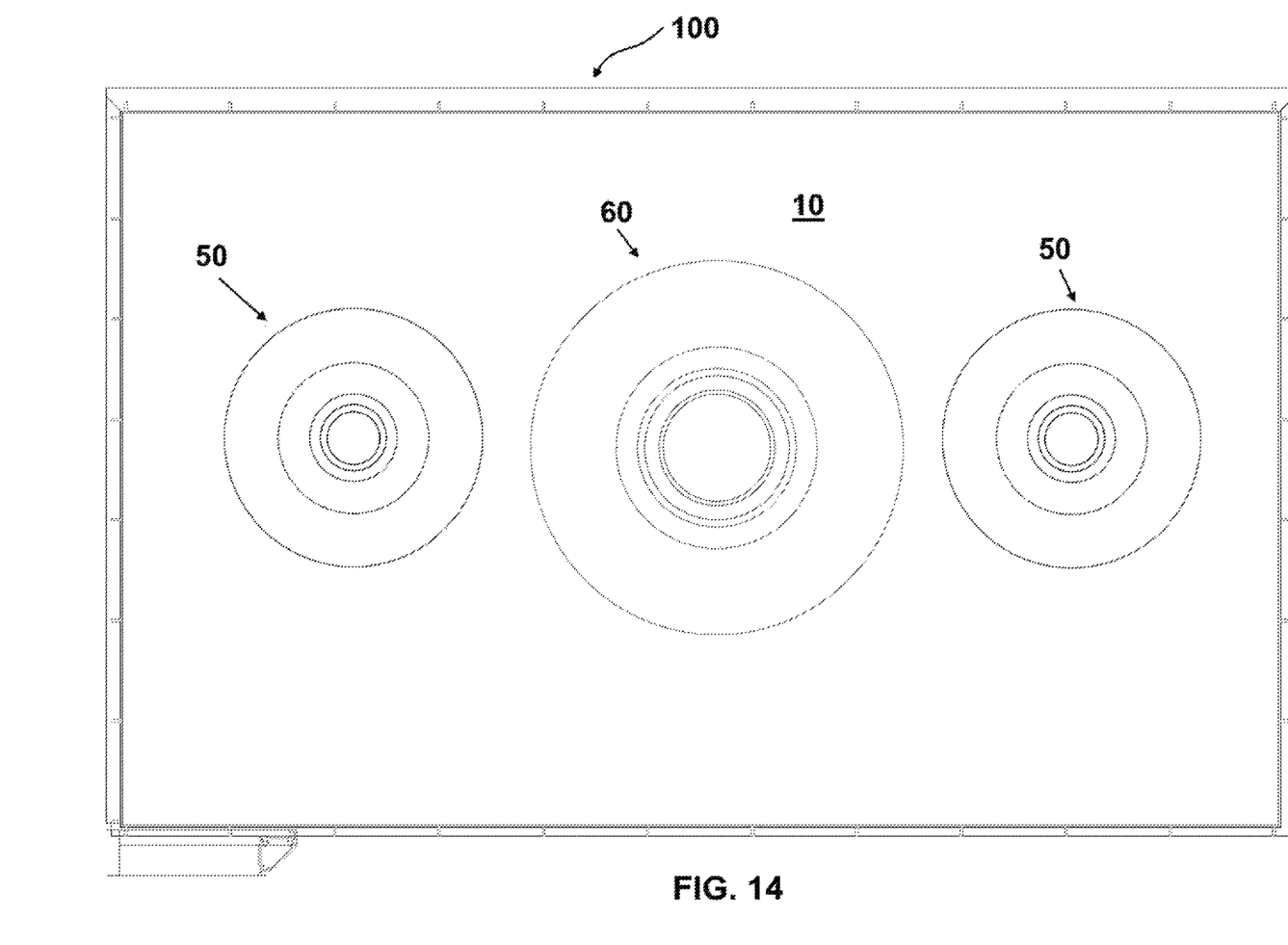
FIG. 14 is a top view of a system for detecting and containing liquid leaks in accordance with the principles of the present invention shown with two pipe boots for water inlets and a pipe boot for drain.

Now referring to FIG. 14, an embodiment of a water collection tub 100 having pipe boots 50 installed is illustrated. In such an embodiment, apertures were made in the base 10 to allow inlet pipes and drain pipes to pass through the base 10. A boot pipe 50 is installed on each water inlet, allowing a sealed environment to keep liquid within the tub 100. A sealing patch 160 is additionally installed on the drain pipe to also allow a sealed environment.

The water collection tub 100 is installed with the pipes passing through the tub and the pipe boot 40, 50 is installed around the pipe by sliding the pipe boot 40, 50 adjacent to the tub while taking caution to remove any dirt or uneven surfaces. Excess material from the boot can then be trimmed off. The boot apron or patch 60, 160 can then be securely and permanently adhered to the bottom of the water collection tub using the provided adhesive. Some adhesives need to cure several seconds before pressing the boot apron and the tub together using a roller. Care should be taken to remove any bubbles or wrinkles which would result in a weakness in the system that can allow fluid to pass through. Using optional hose clamps (not shown), the boot sleeve can be further sealed onto the pipe, thus forming a watertight seal with the pipe. The pipe boot, or pipe flashing system for sealing around the edges of where the pipe passes through the collection tub, thereby sealing the system in a watertight manner. This improvement over previous water leak detectors eliminates the need to create a vulnerable area for allowing the drainage pipes to pass through, a vulnerable area that is not covered by the tub 100. The present invention therefore aims at eliminating a significant weakness or vulnerability of previous systems.

In some embodiments, the water collection tub 100 may further comprise a liquid detection system (not shown), such as a smart alarm system. The detection system generally comprises a sensor for detecting a level of liquid in the tub 100 or simply humidity caused by water leaks in the tub 100. In a typical embodiment, once the sensor is in contact with liquid or humidity, the detection system generates one or more signals to an alarm system, such as bell which can be adjusted to a predetermined sound level.

In yet other embodiments, the detection system may comprise a networking unit adapted to communicate with a remote server or computerized device. The detection system may send any type of notification, such as push alerts, emails and even ring the owner's phone. Alternatively, the alarm system may be connected to one or more lights of the building such that once a leak is detected, the alarm turns on or off the lights inside the home to alert the owner of an imminent water threat. One important advantage of the smart alarm system disclosed in the present invention is the possibility of a connection to the home owner's water shutoff valve that can be monitored and operated at distance in case the homeowner is away for an extended period of time such as in the case of a vacation or business trip. The alarm system can be integrated to any smart home hub such as those provided by Google®, Amazon® or Apple®.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. An apparatus for collecting liquid leaking in a wood product cabinet, the apparatus comprising:
    a tub, the tub further comprising:
        a base to be laid on and to cover an inner base surface of the cabinet;
        side walls and a back wall, the side and back walls extending upwardly at an angle from the base, a top portion of the side and back walls being resilient and forming a gap therebetween to allow a lateral flexing of the top portion of the side and back walls when pushed against inner walls of the cabinet to adjust a width and a depth of the tub to the dimensions of the cabinet;
        a front wall extending upwardly from the base; and
        an opening in said base.

2. The apparatus of claim 1, wherein the apparatus further comprises a fluid detection sensor.

3. The apparatus of claim 2, wherein the apparatus further comprises an alarm configured to receive a signal from the fluid detection sensor.

4. The apparatus of claim 2, wherein the fluid detection sensor communicates with a remote device.

5. The apparatus of claim 4, wherein the remote device comprises a water shutoff valve.

6. The apparatus of claim 1 further comprising at least one boot for sealing a pipe passing through said opening for preventing leakage of the tub via said opening.

7. The apparatus of claim 6 further comprising a sealing patch for sealing the at least one boot and the tub.

8. The apparatus of claim 1, wherein the front wall comprises a rigid structure extending a portion of a width of the front wall, said rigid structure increasing the rigidity of the front wall.

9. An apparatus for collecting liquid leaking in a wood product cabinet, the apparatus comprising:
    a tub, wherein the tub comprises:
        a base laid on a base surface of the cabinet; and
        side walls and a back wall, the side and back walls slantingly extending from the base;
    a fluid detection system comprising a fluid detection sensor;
    wherein a top portion of the side and back walls are resilient and form a gap therebetween to allow a lateral flexing of the top portion of the side and back walls to push against inner walls of the cabinet and to adjust a width and a depth of the tub to the dimensions of a cabinet; and
    wherein the fluid detection system is configured to communicate with a remote device.

10. The apparatus of claim 9 further comprising at least one boot for sealing a pipe passing through the tub for preventing leakage of the tub.

11. The apparatus of claim 10 further comprising a sealing patch for sealing the at least one boot and the tub.

* * * * *